(12) United States Patent
Cho et al.

(10) Patent No.: US 12,362,434 B2
(45) Date of Patent: Jul. 15, 2025

(54) BUTTON-TYPE SECONDARY BATTERY

(71) Applicant: LG ENERGY SOLUTION, LTD., Seoul (KR)

(72) Inventors: Min Su Cho, Daejeon (KR); Byung Sup Kim, Daejeon (KR); Joo Hwan Sung, Daejeon (KR); Yong Gon Lee, Daejeon (KR); Geun Young Park, Daejeon (KR); Min Gyu Kim, Daejeon (KR); Min Seon Kim, Daejeon (KR); Yeong Hun Jung, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 499 days.

(21) Appl. No.: 17/799,831

(22) PCT Filed: Jul. 15, 2021

(86) PCT No.: PCT/KR2021/009145
§ 371 (c)(1),
(2) Date: Aug. 15, 2022

(87) PCT Pub. No.: WO2022/025495
PCT Pub. Date: Feb. 3, 2022

(65) Prior Publication Data
US 2023/0087062 A1 Mar. 23, 2023

(30) Foreign Application Priority Data
Jul. 31, 2020 (KR) .................. 10-2020-0096061

(51) Int. Cl.
*H01M 50/474* (2021.01)
*H01M 50/109* (2021.01)
(Continued)

(52) U.S. Cl.
CPC ....... *H01M 50/474* (2021.01); *H01M 50/109* (2021.01); *H01M 50/51* (2021.01); *H01M 50/512* (2021.01); *H01M 50/538* (2021.01)

(58) Field of Classification Search
CPC ............ H01M 50/474; H01M 50/109; H01M 50/538; H01M 50/51; H01M 50/512
See application file for complete search history.

(56) References Cited

U.S. PATENT DOCUMENTS

| 2007/0254210 A1 | 11/2007 | Aamodt et al. |
| 2009/0077794 A1 | 3/2009 | Hirakawa et al. |

(Continued)

FOREIGN PATENT DOCUMENTS

| CN | 102195075 A | 9/2011 |
| JP | H11-265700 A | 9/1999 |

(Continued)

OTHER PUBLICATIONS

KR20190032058 translation (Year: 2019).*

(Continued)

*Primary Examiner* — Jane J Rhee
(74) *Attorney, Agent, or Firm* — Morgan, Lewis & Bockius LLP

(57) ABSTRACT

A button-type secondary battery includes an electrode assembly including a first separator, a negative electrode, a second separator, and a positive electrode that are sequentially stacked and wound, wherein ends of the first separator and the second separator are disposed closer to a center of the wound electrode assembly than ends of the positive electrode and the negative electrode; an electrolyte; and a can in which the electrode assembly and the electrolyte are accommodated. In the electrode assembly, an expansion member is attached to at least one central end of the first (Continued)

separator or the second separator, and the expansion member is expanded by absorbing the electrolyte.

12 Claims, 8 Drawing Sheets

(51) Int. Cl.
*H01M 50/51* (2021.01)
*H01M 50/512* (2021.01)
*H01M 50/538* (2021.01)

(56) References Cited

U.S. PATENT DOCUMENTS

| | | |
|---|---|---|
| 2011/0217589 A1 | 9/2011 | Kobayashi et al. |
| 2015/0079441 A1 | 3/2015 | Kobayashi et al. |
| 2016/0359201 A1* | 12/2016 | Do .................... H01M 10/0431 |
| 2018/0114970 A1 | 4/2018 | Matsuhara et al. |
| 2020/0044276 A1 | 2/2020 | Sakai et al. |
| 2021/0328290 A1 | 10/2021 | Lee et al. |

FOREIGN PATENT DOCUMENTS

| | | |
|---|---|---|
| JP | 2000-149960 A | 5/2000 |
| JP | 2011-008929 A | 1/2011 |
| JP | 2014-078389 A | 5/2014 |
| JP | 2015-118875 A | 6/2015 |
| JP | 2018-073530 A | 5/2018 |
| JP | WO2018/142928 A1 | 11/2019 |
| KR | 10-2008-0095166 A | 10/2008 |
| KR | 10-2011-0000517 A | 1/2011 |
| KR | 10-1256062 B1 | 4/2013 |
| KR | 10-1851429 B1 | 4/2018 |
| KR | 10-2019-0032058 A | 3/2019 |
| KR | 10-2019-0066411 A | 6/2019 |
| KR | 10-2020-0020619 A | 2/2020 |

OTHER PUBLICATIONS

International Search Report (with partial translation) and Written Opinion dated Nov. 2, 2021, for corresponding International Patent Application No. PCT/KR2021/009145.

Office Action issued on Mar. 20, 2025 in Chinese Patent Application No. 202180012311.8 Note: KR20190032058A, U.S. Pat. No. 2016359201A1, JP2015118875A and JP2011008929A cited therein are already of record.

* cited by examiner

BUTTON-TYPE SECONDARY BATTERY

CROSS-REFERENCE TO RELATED APPLICATION

The present application claims the benefit of the priority of Korean Patent Application No. 10-2020-0096061, filed on Jul. 31, 2020, which is hereby incorporated by reference in its entirety.

TECHNICAL FIELD

The present invention relates to a button-type secondary battery, and more particularly, to a button-type secondary battery, in which an external vibration or impact is effectively buffered to prevent an electrode assembly from being damaged, thereby increasing life expectancy, and a hole of the electrode assembly is filled to prevent the electrode assembly from being deformed.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like a cylindrical or pouch-type secondary battery.

The button-type secondary battery has a structure in which an upper can a lower can are coupled to each other. Each of the upper can and the lower can has a flat cylindrical shape having a diameter greater than a height thereof, and the upper can has a diameter that is slightly greater than that of the lower can.

Furthermore, an electrode assembly, in which a positive electrode, a separator, and a negative electrode are wounded in a state of being stacked, and an electrolyte are mounted in the lower can.

As illustrated in FIG. 1 that illustrates a state when a jelly roll-type electrode assembly starts to be manufactured, the electrode assembly is manufactured to have a structure, in which, when a core 1 starts to rotate in a state in which a first separator 2a and a second separator 2b are fixed, a negative electrode 3 is put outside the first separator 2a, and a positive electrode 4 is put between the first separator 2a and the second separator 2b so that the first separator 2a, the negative electrode 3, the second separator 2b, and the positive electrode 4 are wound in a state of being stacked in order from the center. Alternatively, the negative electrode 3, the second separator, and the positive electrode 4 may be sequentially put while the first separator 2a is wound around a core 1 according to a manufacturing method.

In the case of such an electrode assembly, since the electrode assembly is embedded in a metal can, when an external impact or vibration is applied, the impact or vibration is directly transmitted to the electrode assembly to damage the electrode assembly.

Particularly, after the electrode assembly is manufactured, since the core is removed to form a hole in the center of the electrode assembly, there is a possibility that deformation occurs in the vicinity of the hole due to the vibration or impact.

DISCLOSURE OF THE INVENTION

Technical Problem

Accordingly, the main object of the present invention is to provide a button-type secondary battery capable of preventing damage and deformation of an electrode assembly that may be caused by external impact and vibration.

Technical Solution

An electrode assembly, in which a first separator, a negative electrode, a second separator, and a positive electrode are wound in a state of stacked sequentially, wherein ends of the first separator and the second separator are disposed closer to a center than ends of the positive electrode and the negative electrode, according to the present invention for achieving the above object comprises: an electrolyte; and a can in which the electrode assembly and the electrolyte are embedded, wherein, in the electrode assembly, an expansion member is attached to at least one central end of the first separator or the second separator, and the expansion member is expanded by absorbing the electrolyte.

A hole may be formed in a center of the electrode assembly, and the expansion member may be filled into the hole formed in the center.

The expansion member may be attached to all the ends of each of the first separator and the second separator.

The expansion member may be attached to an entire side formed along a width direction at the ends of each of the first separator and the second separator.

Each of the separators may have a width greater than that of each of the negative electrode and the positive electrode and is wound in a state of being stacked to protrude to both sides of each of the negative electrode and the positive electrode, and an expansion member may be additionally attached to each of portions of both the sides of the separators, which protrude from the negative electrode and the positive electrode.

The expansion member additionally attached to each of the portions of both the sides of the separators, which protrude from the negative electrode and the positive electrode, may be attached to all the both surfaces of each of the separators.

The expansion member additionally attached to both the sides of each of the separators may be continuously attached along a longitudinal direction of the separators. The expansion member additionally attached to both the sides of each of the separators may be discontinuously attached to form a disconnected portion in the longitudinal direction of the separators.

The can may comprise a lower an having an opened upper side so that the electrode assembly and the electrolyte are mounted, and an upper can coupled to close the upper side of the lower can, and when the expansion member additionally attached to both the sides of each of the separators absorbs the electrolyte, in the electrode assembly mounted in the lower can, both the sides of the separators may be spaced apart from inner surfaces of the upper can and the lower can, respectively.

When the expansion member additionally attached to both the sides of each of the separators absorbs the electrolyte, the expansion member disposed at a lower side of the electrode assembly and the expansion member disposed at an upper side of the electrode assembly may be in contact with the inner surface of the lower can and the inner surface of the upper can, respectively.

The expansion member additionally attached to each of both the sides of the separators and the expansion member attached to the central end of each of the separators may be made of the same material. The expansion member additionally attached to each of both the sides of the separators and the expansion member attached to the central end of each of the separators may comprise swelling tapes made of the same material.

Furthermore, the present invention may provide a secondary battery module in which the plurality of button-type secondary batteries, each of which has the above configuration, are electrically connected to each other in parallel or series.

Advantageous Effects

In the present invention having the above-described configuration, when the expansion member absorbs the electrolyte so as to be expanded, and thus, an external impact or vibration is applied, the expansion member may discharge the electrolyte to attenuate the impact energy and vibration energy.

Furthermore, since the expansion member fills the hole in the center of the electrode assembly, the electrode assembly may be prevented from being deformed.

In the separators, the expansion member may be additionally attached to the portions of each of both the sides of the separators, which protrude from the positive electrode and the negative electrode, and the additionally attached expansion members may be disposed between the top surface of the electrode assembly and the inner surface of the upper can and between the bottom surface of the electrode assembly and the inner surface of the lower can to support the electrode assembly, the upper can, and the lower can, thereby improving the buffering efficiency.

Each of the additionally attached expansion members may be continuously or discontinuously attached along the longitudinal direction of each of the separators according to the expansion rate.

The adhesion surface of each of the expansion members may be provided as the swelling tape, and thus, when the separator is manufactured, the expansion member may be easily attached.

In addition, the present invention may further provide the button-type secondary battery module in which the plurality of button-type secondary batteries are connected to each other.

MODE FOR CARRYING OUT THE INVENTION

Figure 1:
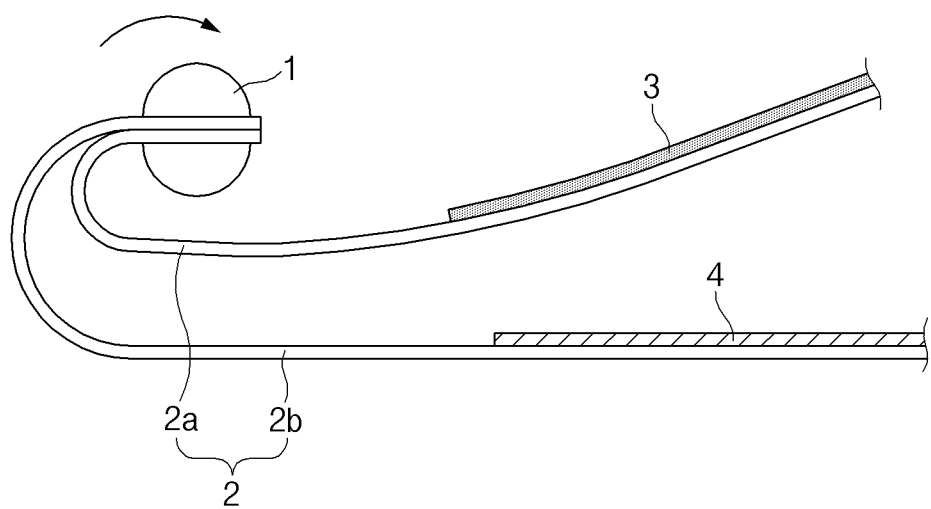
FIG. 1 is a view illustrating a state in which a jelly roll-type secondary battery starts to be manufactured.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Figure 2:
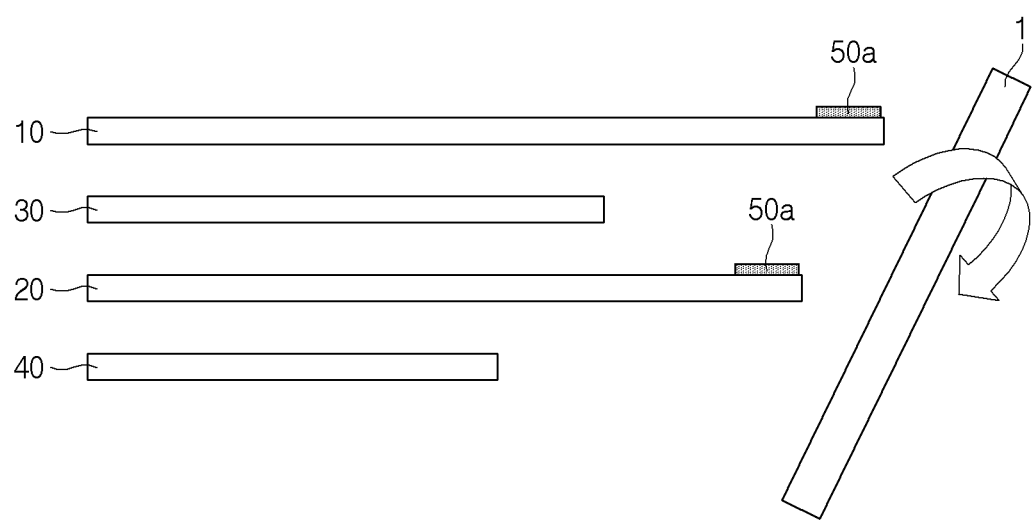
FIG. 2 is a view illustrating a state in which an electrode assembly starts to be manufactured according to the present invention.

The present invention relates to a button-type secondary battery having a structure having a diameter greater than a height thereof and has a structure in which an electrode assembly and an electrolyte are mounted in a can. As illustrated in FIG. 2 that illustrates a state when the electrode assembly starts to be manufactured according to the present invention, the electrode assembly may be manufactured so that, when a core 1 starts to rotate in a state in which a first separator 10 and a second separator 20 are fixed to the core 1 (or a state in which the first separator is fixed, and the second separator is put next), a positive electrode 40 is put outside the first separator 10 or the second separator 20, and a negative electrode 30 is put between the first separator 10 and the second separator 20 so that the first separator 10, the negative electrode 30, the second separator 20, and the positive electrode 40 are wound in a state of being stacked in order from the center (alternatively, the negative electrode 30, the second separator 20, and the positive electrode 40 are sequentially put while the first separator 10 is wound around the core 1 according to a manufacturing method).

Therefore, in the electrode assembly according to the present invention, ends of the first separator 10 and the second separator 20 are disposed closer to the center than ends of the positive electrode 40 and the negative electrode 30.

Hereinafter, embodiments according to the present invention will be described with reference to the accompanying drawings.

First Embodiment

Figure 3:
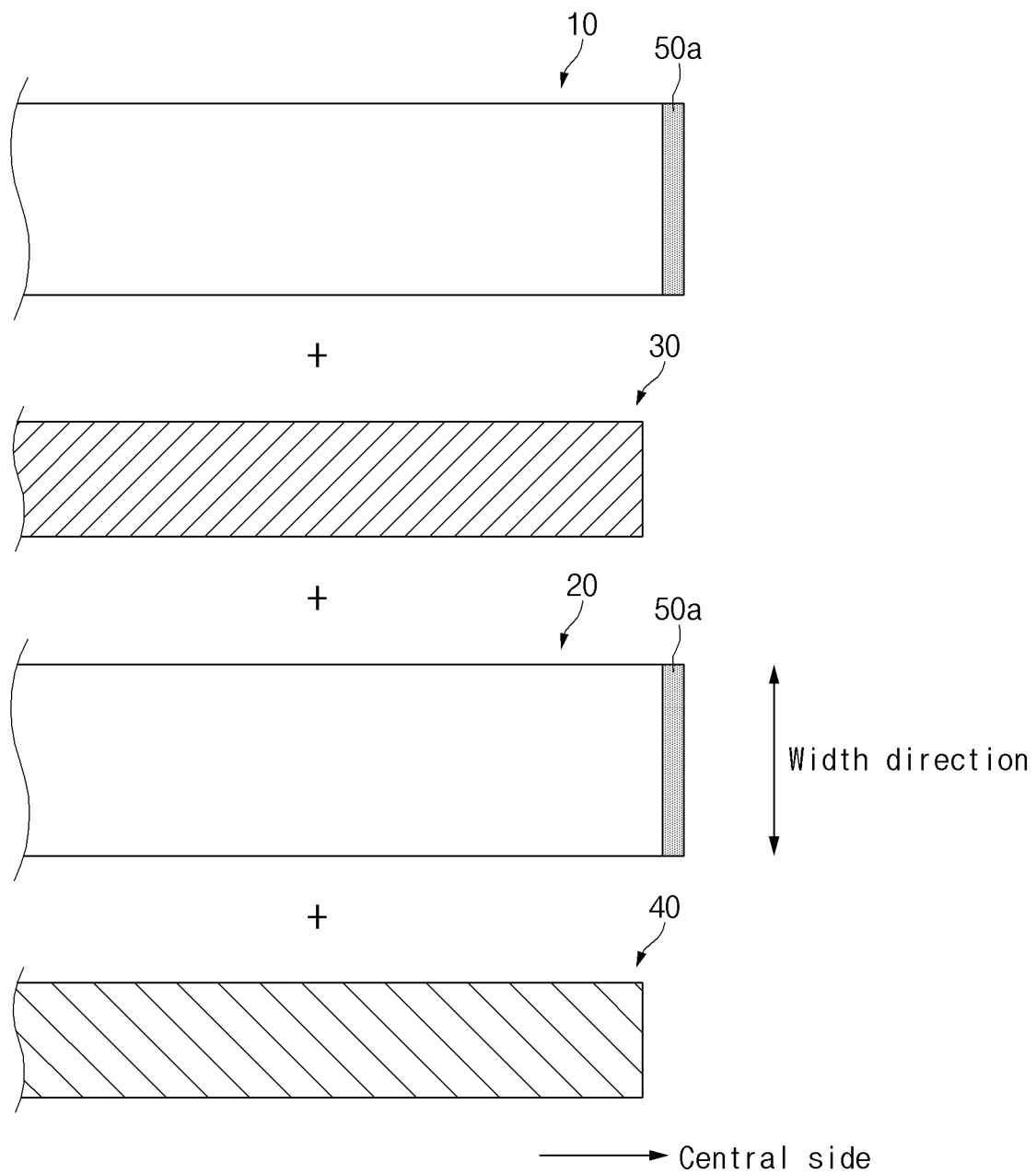
FIG. 3 is a view illustrating a state in which each of separators, a positive electrode, and a negative electrode is unfolded before being wound to be manufactured as the electrode assembly according to the present invention.
Figure 4:
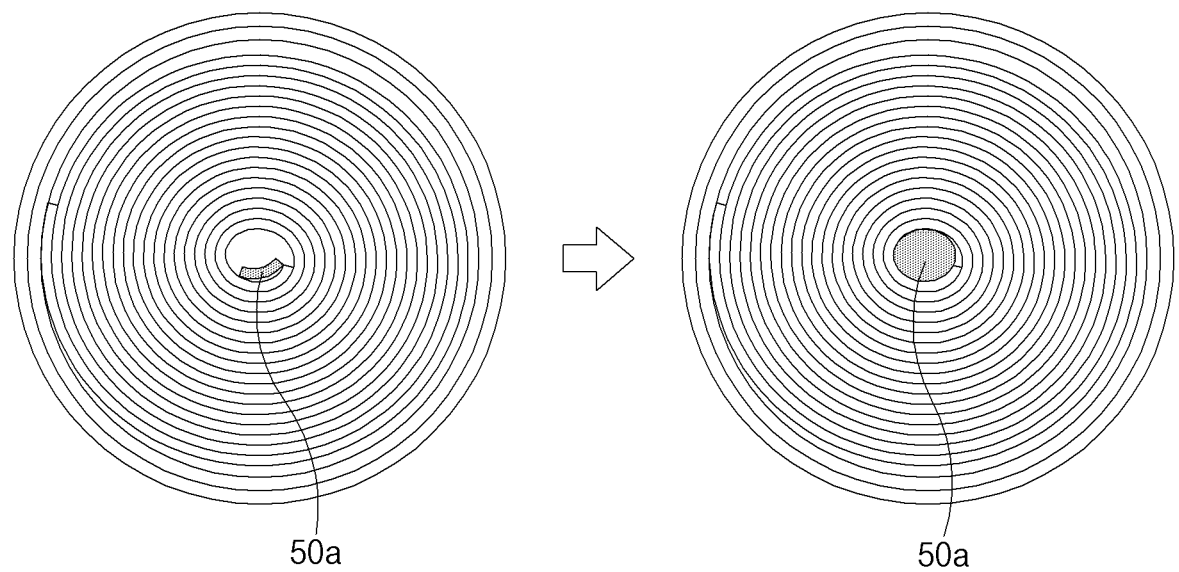
FIG. 4 is a view illustrating a state (a left side) when the separators, the negative electrode, and the positive electrode of FIG. 3 are wound, and a state (a right side) in which an expansion member absorbs an electrolyte so as to be expanded and thus filled into a hole.

FIG. 3 is a view illustrating a state in which each of a separator, a positive electrode, and a negative electrode is unfolded before being wound to be manufactured as the electrode assembly according to the present invention, and FIG. 4 is a view illustrating a state (a left side) when the separators, the negative electrode, and the positive electrode of FIG. 3 are wound, and a state (a right side) in which an expansion member absorbs an electrolyte so as to be expanded and thus filled into a hole.

In this embodiment, an expansion member 50a is attached to a central end of at least one of the first separator 10 or the second separator 20 included in the electrode assembly, preferably each of central ends of both the first separator 10 and the second separator 20. Here, the center side means a direction toward a centrifugal direction of the electrode assembly manufactured in a circular shape, and thus, the central end means an end fixed to the core 1.

The expansion member 50a is made of a material that is capable of being expanded in volume by absorbing an electrolyte, but does not cause a chemical reaction with the electrolyte. The expansion member 50a may be provided as a swelling tape capable of being applied to the secondary battery and may be manufactured by mixing any one selected from the group consisting of polypropylene-based, acrylate-based, urethane-based, epoxy-based, and cellulose-based, or a mixture of two or more materials thereof.

The expansion member 50a is attached to each of the ends of the first separator 10 and the second separator 20, for example, is formed along the entire side of the end formed in a width direction (see FIG. 3) at each of the ends of the first separator 10 and the second separator 20.

As described above, since the separators 10 and 20 are wound together with the negative electrode 30 and the positive electrode 40 through the core in the state in which the expansion member 50a is attached to each of the central ends of the separators 10 and 20, when the core is separated after the winding is completed, as illustrated at the left side in FIG. 4, the electrode assembly according to this embodiment has a hole at a center thereof, and the expansion member 50a is disposed in the hole.

Then, when the electrode assembly is mounted in a can, and the electrolyte is injected into the can, the expansion member 50a absorbs the electrolyte so as to be expanded in volume and thus filled into the hole.

When external force is applied to the electrode assembly, the expansion member of which the volume is expanded may discharge the electrolyte again to buffer the external force applied to the electrode assembly. Also, when time elapses, the electrolyte may be re-absorbed, and thus, the expansion member 50a may return to its original expanded state.

Second Embodiment

As illustrated in FIG. 3, in the present invention, each of the separators 10 and 20 has a width greater than that of each of the negative electrode 30 and the positive electrode 40. Therefore, when being put into the core and then wound, both sides (an upper side and a lower side in FIG. 3) of each of the separators 10 and 20 are wound to protrude from the negative electrode 30 and the positive electrode 40 (toward each of upper and lower sides in FIG. 3).

In this embodiment, each of the separators 10 and 20 provides a structure in which the expansion member 50b is additionally attached to each of the portions of both the sides of the separators 10 and 20, which protrude from each of the negative electrode 30 and the positive electrode 40.

Figure 5:
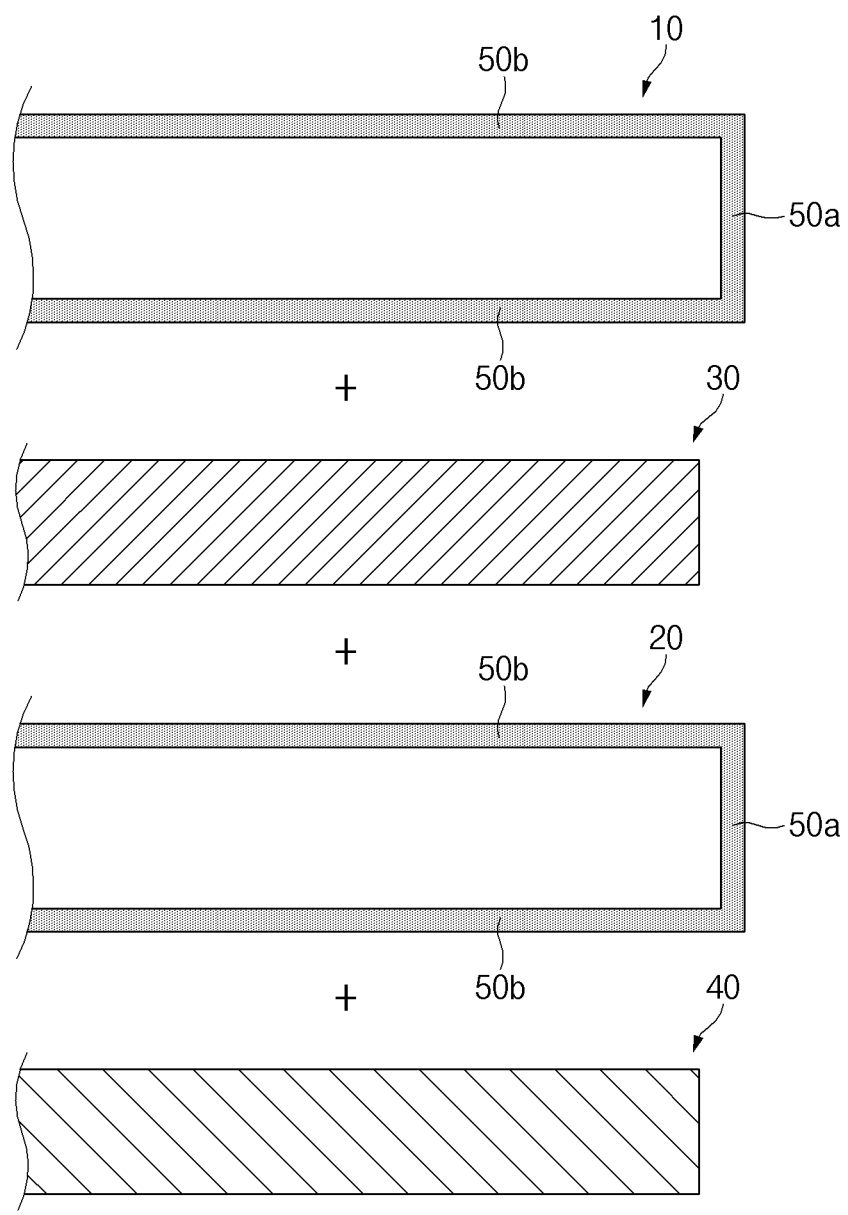
FIG. 5 is a view illustrating a state in which each of the separators, the positive electrode, and the negative electrode is folded before being wound to be manufactured as the electrode assembly, i.e., a state in which the additional expansion member is continuously attached to each of both sides of the separators according to the present invention.
Figure 6:
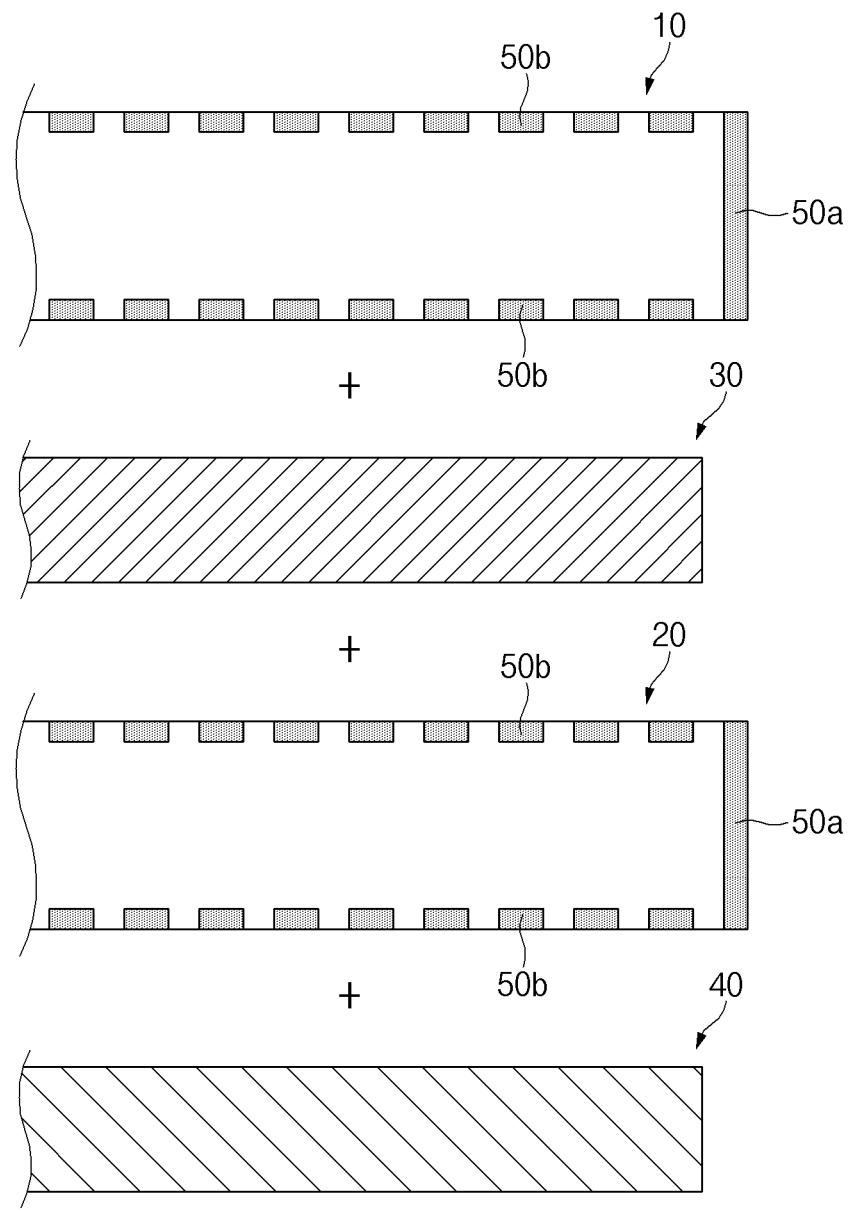
FIG. 6 is a view illustrating a state in which each of a separator, a positive electrode, and a negative electrode is folded before being wound to be manufactured as the electrode assembly, i.e., a state in which the additional expansion member is discontinuously attached to each of both sides of the separator to form a disconnected portion according to the present invention.

FIG. 5 is a view illustrating a state in which each of the separators 10 and 20, the positive electrode 40, and the negative electrode 30 is folded before being wound to be manufactured as the electrode assembly, i.e., a state in which the additional expansion member 50b is continuously attached to each of both sides of the separator 10 and 20 according to the present invention, and FIG. 6 is a view illustrating a state in which each of the separators 10 and 20, the positive electrode, and the negative electrode is folded before being wound to be manufactured as the electrode assembly, i.e., a state in which the additional expansion member 50b is discontinuously attached to each of both sides of the separators 10 and 20 to form a disconnected portion according to the present invention.

Referring to FIGS. 5 and 6, in this embodiment, as in the first embodiment, not only the expansion member 50a is attached to each of the central ends of the separators 10 and 20, but also the expansion member 50b is additionally attached to each of the portions of the separators 10 and 20, which protrude from the negative electrode 30 and the positive electrode 40, i.e., to each of both the sides of the separators 10 and 20, which protrude in the width direction. The additionally attached expansion member 50b may be attached to one or both surfaces of each of the separators 10 and 20.

The expansion member 50b additionally attached to both the sides of each of the separators 10 and 20 may be continuously attached along a longitudinal direction of each of the separators 10 and 20 as illustrated in FIG. 5. Alternatively, in consideration of an expansion rate of the expansion member 50b, the expansion member 50b may be discontinuously attached to form a disconnected portion in the longitudinal direction of the each of the separators 10 and 20 as illustrated in FIG. 6.

Figure 7:
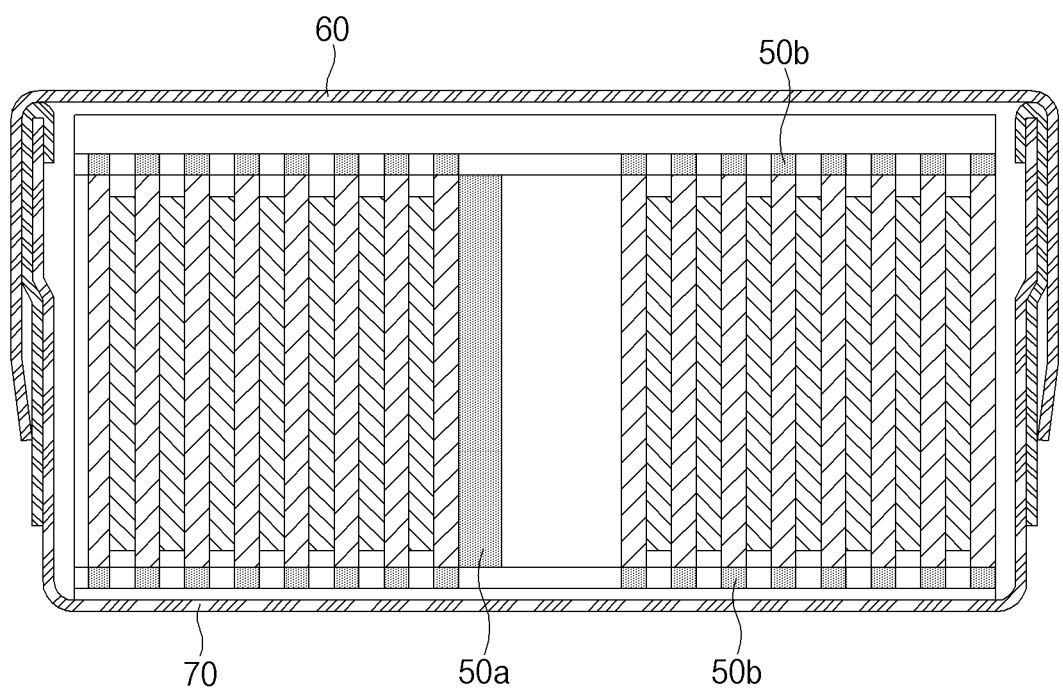
FIG. 7 is a longitudinal cross-sectional view of a button-type secondary battery before an expansion member is expanded according to the present invention.
Figure 8:
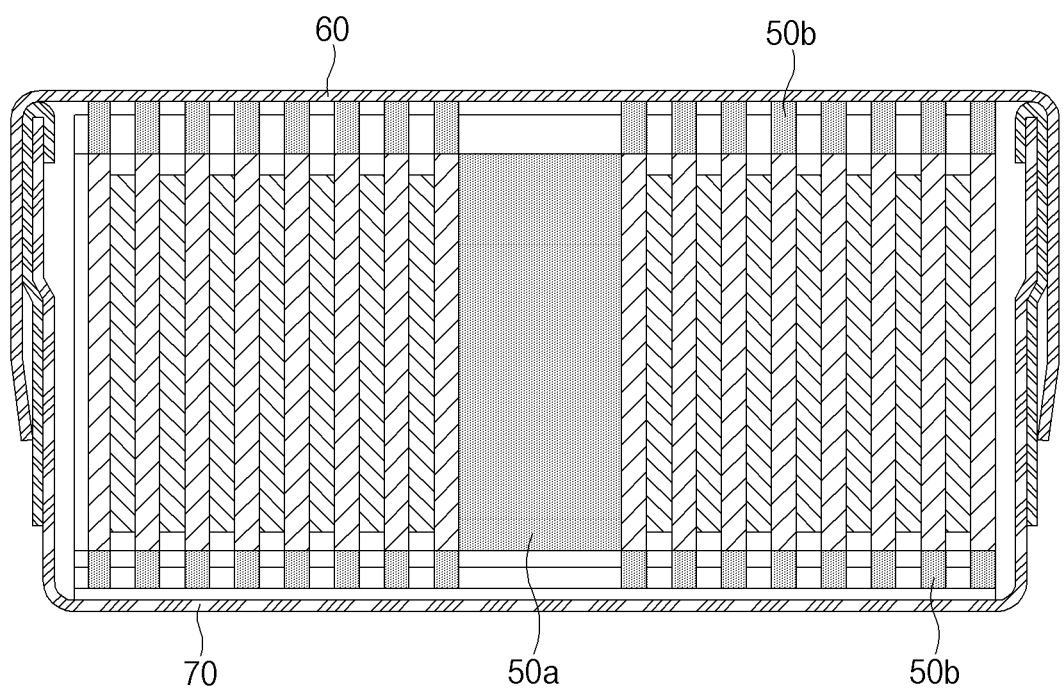
FIG. 8 is a longitudinal cross-sectional view of the button-type secondary battery after the expansion member is expanded according to the present invention.

FIG. 7 is a longitudinal cross-sectional view of a button-type secondary battery before expansion members 50a and 50b are expanded according to the present invention, and FIG. 8 is a longitudinal cross-sectional view of the button-type secondary battery after the expansion members 50a and 50b are expanded according to the present invention.

As illustrated in FIGS. 7 and 8, in the present invention, the can comprises a lower can 70 having an opened upper side so that the electrode assembly and the electrolyte are mounted, and an upper can 60 coupled to close the upper side of the lower can 70.

As described above, the electrode assembly to which the expansion members 50a and 50b are attached to not only the central ends and but also both the sides protruding in the width direction may be mounted in the lower can 70 together with the electrolyte as illustrated in FIG. 7.

In addition, after a predetermined time elapses, when the expansion members 50a and 50b absorb the electrolyte, in a state in which both the sides of each of the separators 10 and 20 of the electrode assembly are spaced apart from an inner surface of the upper can 60 and an inner surface of the lower can 70, as illustrated in FIG. 8, the expansion member 50b disposed at a lower side of the electrode assembly and the expansion member 50b disposed at an upper side of the electrode assembly are in contact with the inner surface of the lower can 70 and the inner surface of the upper can 60. Accordingly, the electrode assembly is supported by the expanded expansion member 50b so as to be prevented from moving inside the can.

In this embodiment, it is preferable that the expansion member 50b additionally attached to each of both the sides of the separators 10 and 20 and the expansion member 50a attached to each of the central ends of the separators 10 and 20 are made of the same material.

Thus, the expansion member 50b additionally attached to each of both the sides of the separators 10 and 20 may be a swelling tape made of the same material as the expansion member 50a attached to the central end as described above.

Furthermore, the present invention may provide a secondary battery module in which the plurality of button-type secondary batteries, each of which has the above configuration, are electrically connected to each other in parallel or series.

In the present invention having the above-described configuration, when the expansion members 50a and 50b absorb the electrolyte so as to be expanded, and thus, the external impact or vibration is applied, the expansion members 50a and 50b may discharge the electrolyte to attenuate impact energy and vibration energy.

Furthermore, since the expansion member 50a fills the hole in the center of the electrode assembly, the electrode assembly may be prevented from being deformed.

In the separators, the expansion member 50b may be additionally attached to each of the portions of both the sides of the separators, which protrude from the positive electrode and the negative electrode disposed on both the sides, and the additionally attached expansion members 50b may be disposed between the top surface of the electrode assembly and the inner surface of the upper can and between the bottom surface of the electrode assembly and the inner surface of the lower can to support the electrode assembly, the upper can, and the lower can, thereby improving the buffering efficiency.

The additionally attached expansion member 50b may be continuously or discontinuously attached along the longitudinal direction of each of the separators according to the expansion rate.

The adhesion surface of each of the expansion members may be provided as the swelling tape, and thus, when the separator is manufactured, the expansion member may be easily attached.

In addition, the present invention may further provide the button-type secondary battery module in which the plurality of button-type secondary batteries are connected to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

- 10: Separator
- 20: Separator
- 30: Negative electrode
- 40: Positive electrode
- 50a, 50b: Expansion member

The invention claimed is:

1. A button-type secondary battery, comprising:
   an electrode assembly including a first separator, a negative electrode, a second separator, and a positive electrode that are sequentially stacked and wound, wherein ends of the first separator and the second separator are disposed closer to a center of the wound electrode assembly than ends of the positive electrode and the negative electrode;
   an electrolyte; and
   a can in which the electrode assembly and the electrolyte are accommodated,
   wherein, in the electrode assembly, an expansion member includes a first expansion member portion that is attached to at least one central end of the first separator or the second separator, and the expansion member is expanded by absorbing the electrolyte,
   wherein each of the first and second separators has a width greater than that of each of the negative electrode and the positive electrode and is wound in a state of being stacked to protrude to both sides of each of the negative electrode and the positive electrode, and
   wherein the expansion member further includes a second expansion member that is additionally attached to each of portions of both the sides of the first and second separators, which protrude from the negative electrode and the positive electrode.

2. The button-type secondary battery of claim 1, wherein a hole is formed in a center of the electrode assembly, and the expansion member is filled into the hole formed in the center.

3. The button-type secondary battery of claim 1, wherein the expansion member is attached to all the ends of each of the first separator and the second separator.

4. The button-type secondary battery of claim 3, wherein the expansion member is attached to an entire side along a width direction at the ends of each of the first separator and the second separator.

5. The button-type secondary battery of claim 1, wherein the expansion member additionally attached to each of the portions of both the sides of the first and second separators, which protrude from the negative electrode and the positive electrode, are attached to all of the both sides of each of the first and second separators.

6. The button-type secondary battery of claim 1, wherein the expansion member additionally attached to both the sides of each of the first and second separators is continuously attached along a longitudinal direction of the first and second separators.

7. The button-type secondary battery of claim 1, wherein the expansion member additionally attached to both the sides of each of the first and second separators is discontinuously attached to form a disconnected portion in a longitudinal direction of the first and second separators.

8. The button-type secondary battery of claim 1, wherein the can comprises a lower can having an opened upper side so that the electrode assembly and the electrolyte are mounted, and an upper can coupled to close the opened upper side of the lower can, and
   when the expansion member additionally attached to both the sides of each of the first and second separators absorbs the electrolyte, in the electrode assembly mounted in the lower can, both the sides of the first and second separators are spaced apart from inner surfaces of the upper can and the lower can, respectively.

9. The button-type secondary battery of claim 8, wherein, when the expansion member additionally attached to both the sides of each of the first and second separators absorbs the electrolyte, the expansion member disposed at a lower side of the electrode assembly and the expansion member disposed at an upper side of the electrode assembly are in contact with the inner surface of the lower can and the inner surface of the upper can, respectively.

10. The button-type secondary battery of claim 1, wherein the expansion member additionally attached to each of both the sides of the first and second separators and the expansion member attached to the central end of each of the first and second separators include a same material.

11. The button-type secondary battery of claim 10, wherein the expansion member additionally attached to each of both the sides of the first and second separators and the expansion member attached to the central end of each of the first and second separators comprise swelling tapes of the same material.

12. A secondary battery module, in which a plurality of button-type secondary batteries of claim 1 are electrically connected to each other in parallel or in series.

* * * * *